United States Patent Office 3,260,731
Patented July 12, 1966

3,260,731
PROCESS FOR PREPARING FURONITRILE
Thomas J. Jennings, Lafayette, Calif., assignor to Shell Oil Company, New York, N.Y., a corporation of Delaware
No Drawing. Filed Mar. 2, 1964, Ser. No. 348,827
4 Claims. (Cl. 260—346.1)

This invention relates to a process for preparing furonitrile.

Certain organic nitriles have useful solvent characteristics and are used extensively in extractive distillation processes, such as the separation of mixtures of hydrocarbons of differing degrees of saturation. Furonitrile, a heterocyclic nitrile, demonstrates similar solvent characteristics for separations but is not economically available in commercial quantities. Among other uses of furonitrile is that of a synthetic sweetening agent for low calorie foods and drinks, exhibiting a sweetening effect approximately 30 times that of sugar.

Such uses of furonitrile, as well as many other commercial applications, are somewhat restricted by the cumbersome, inefficient known processes for preparing furonitrile. A process has been sought in which readily available furfural could be converted directly and economically into furonitrile.

Since it is known that certain aliphatic olefins and aliphatic aldehydes can be catalytically reacted with ammonia, especially in the presence of oxygen, to prepare aliphatic nitriles, it was believed that furfural and ammonia could be combined in a like manner to prepare furonitrile. However, attempts to prepare furonitrile by reacting furfural and ammonia in processes similar to those for preparing the aliphatic nitriles were almost completely inoperable, giving nominal yields of furonitrile at best. These attempts to combine ammonia and furfural gave substantial quantities of dark brown tarry substances, probably partially the readily formed hydrofurfuramide, which precipitated in the feed line(s), in the reaction zone, and on the surfaces of the catalyst to an extent that the line(s) become clogged and the activity of the catalyst was reduced to almost zero.

Because the known techniques were found to be inapplicable to the preparation of furonitrile by reacting ammonia and furfural a process by which this could be accomplished has been sought.

Accordingly, it is a principal object of the invention to provide a process by which furonitrile may be directly synthesized from furfural and ammonia.

Another object is a new process for preparing furonitrile which is capable of commercial applications and will make furonitrile available in commercial quantities at greater savings.

The advantages of this novel process will be apparent from the description and it is not intended that the stated objects limit the invention.

Furfural and ammonia can be reacted to synthesize furonitrile and the objects of the invention accomplished by a vapor phase process in which furfural is contacted with ammonia only when both the furfural and ammonia are substantially in intimate contact with a specific catalyst and in the presence of molecular oxygen. Employing these techniques at elevated temperatures, it is possible to achieve 97% selectivity to furonitrile with high conversions of the furfural.

More specifically, this novel process is preferably carried out in an apparatus having a plurality of separate feed lines which converge in the reaction zone proper. It is through such an apparatus, or similar ones that it is possible to keep the ammonia furfural separated until they are both substantially in contact with the catalyst when they contact one another. In practice, one feed line contains the furfural and oxygen mixture while another contains the ammonia. All the feeds are gaseous and preheated to facilitate temperature control in the process, and also may be diluted with inert gases. It is important that the contact of the furfural and ammonia occur only when both are substantially in intimate contact with the catalyst and at a reaction temperature from 200° to 550° C. The terminology "substantially in intimate contact with the catalyst" means that the process requires that both the furfural and ammonia have either actually contacted the catalyst prior to the time they contact one another, or that the contact of the furfural and ammonia with one another occurs less than 0.1 of a second prior to their contacting the catalyst. It is preferred that any contact of the furfural with the ammonia ahead of the catalyst be for a period of less than 0.01 of a second or that they not be contacted at all before they have prior contact with the catalyst.

By avoiding any appreciable or substantial contact between the furfural and ammonia reactants ahead of the catalyst it is possible to have a process with 82% selectivity for furonitrile based on a 95% conversion of furfural. Such desirable results require that conditions such as temperatures, catalysts and other conditions be carefully selected and controlled within certain defined parameters which will be more fully explained hereafter.

A critical feature alluded to above, the separation of the furfural and ammonia until they are substantially in contact with the catalyst, is usually accomplished through the use of separate feed lines for each, and in practice the furfural is mixed with the oxygen, though alternatively, the oxygen could be supplied by a separate feed line. It was found that it was especially desirable to use inert gaseous diluents in the reactant feeds since the yields of furonitrile were improved. Steam was found to be the preferred diluent and improved the yield when it was present in amounts from 1 to 20% by volume. Other diluents are nitrogen, helium, argon and the like and from an economic point, it is preferred that air be used to supply the oxygen for the reaction since this also supplies nitrogen as a diluent. Also, the presence of steam in the ammonia feed inhibits the oxidation of ammonia to nitrogen, and therefore is advantageous.

Both the selection of the catalyst and the method of contacting the reactants with it are important if the process is to be successfully operated. Generally, the catalyst is employed in particulate form, such as in a fixed bed, a fluidized bed, a fluidized flowing mass or a dispersed phase in the flowing gaseous reactants. Particle size(s) and size distribution is selected according to method in which the catalyst is employed.

This process requires that the catalyst employed be highly active in order that the catalyzed reaction to furonitrile may compete successfully with the homogeneous reaction to form tarry materials. Bismuth, tin and antimony salts of phosphomolybdic and molybdic acids are of this class and the heteropoly metal molybdates such as tungstomolybdate, are operable. The most preferred catalyst is bismuth molybdate.

As indicated above, the catalyst in particulate form may be employed by several different methods and its employment in a tubular reactor is described below but it should not be considered a limitation on the process. Using a tubular reactor, it was found that it was desirable to have the catalyst comminuted to granules which would pass a 10 mesh screen and be retained on a 20 mesh screen. Charging the reaction zone with pure catalyst granules was not necessary and they can be mixed with inert material of like particle size(s) such as glass, silica, alumina, clays, aluminum metal pellets and similar materials. If the charge in the reaction zone contains from 5 to 50% by weight of catalyst in the mixture with the inert materials, the process operates satisfactorily. Glass granules and aluminum granules were used in practice and the latter were preferred because of their ability to conduct heat from the reaction zone.

A preferred catalyst composition is 1 part bismuth molybdate granules (10–20 mesh) with 3 parts aluminum granules (10–20 mesh) by volume. One skilled in the art can select the particulate size(s) of the catalyst and inert materials based on the method of contacting employed when using an alternate to a tubular reactor.

Pressures at or near atmospheric are preferred for the process and positive pressure above 30 p.s.i.g. (pound per square inch gauge) were found to reduce the yield of furonitrile. However, temperatures in the reaction zone must be carefully controlled and it was found that the temperature in the reaction zone should be maintained from 200° to 550° C. Below 200° very little furonitrile will be formed and above 550° thermal decompositions occur at a rapid rate depositing tar-like materials in the reaction zone. Temperatures from 400° to 500° C. are the more preferred with narrow range of 440° to 480° C. favoring exceptionally high yields of furonitrile.

In order to effectively operate the process the contact times of the gaseous mixture containing the furfural and ammonia in the reaction zone must be limited to relatively short intervals as the later examples will show. The gas hourly space velocities at standard temperatures and pressures which are useful in the process are between 15,000 and 150,000. Gas hourly space velocities (GHSV) between 15,000 and 70,000 are the more preferred because of higher selectivities for furonitrile. It should be appreciated that the contact time of the gaseous mixture containing the reacting furfural and ammonia in the reaction zone is extremely short at these high GHSV's. Utilizing these high GHSV's is one of the techniques by which this novel process is made possible.

Though of lesser importance, the molar ratio of the ammonia and furfural in the reaction zone should be controlled to maximize the yield of furonitrile. It is also desirable to have a molar excess of oxygen present relative to smaller mol amount of the two reactants. The molar ratio of the ammonia to furfural in the gaseous mixture in the reaction zone can vary from 3:1 to 1:3, with the preferred ratio having less than a stoichiometric amount of one of these reactants so the process will effect a complete conversion of lesser reactant and avoid reaction between any excess reactants downstream of the catalyst bed (reaction zone), which would form the dark brown tarry or polymeric substances mentioned above in the exit lines. It is desirable to have a molar excess of oxygen based on the smaller mol amount of the two reactants of from 2 to 10, and good yields can be achieved with a molar composition of 3 parts ammonia, 1 part furfural, and 2.5 parts of oxygen in the gaseous mixture passing through the catalyst bed. For economic reasons, it is preferred that air be used to supply the oxygen and this provides a diluent (nitrogen) in the gaseous mixture which is desirable because it increases the yields of furonitrile.

Examples II–IV illustrate specific applications which are not intended to place limitations on the invention. By contrasting these examples with Example I, which is not part of the invention and is included for comparison only, it can be seen that certain conditions in the novel process are critical.

In the examples which are illustrative of the invention, a tubular reactor was employed, but different types of reactors can be employed in practice. Likewise, the preparation of the catalyst (described below) is for a tubular reactor and would be modified to some extent relative to particle size(s) when different types of reactors are employed to effect a contact between the catalyst and the gaseous reactants.

For the examples using the tubular reactor, the catalyst was prepared by adding acidified aqueous bismuth nitrate solution to aqueous ammonium molybdate solution followed by the addition of ammonium hydroxide to adjust the pH to approximately 5.5. The resulting slurry was aged, washed, filtered and dried at 120° C. Thereafter, it was calcined at 500° C. for 2 hours and then comminuted to granules which would pass through a 10 mesh screen and be retained on a 20 mesh screen.

*Example I*

Approximately 1 cc. (0.8 gram) of the above-prepared catalyst granules was mixed with 3 cc. of glass granules having a like particle size (10–20 mesh). This catalyst mixture was used to load a tubular reactor having a volume slightly over 4 cc. and equipped with a heating jacket to maintain the reaction zone at temperatures between 200° and 550° C.

This tubular reactor had two feed lines to the reaction zone containing the catalyst and the flow rate in the two feed lines was adjusted to give a combined flow of 185 cc./minute through the catalyst mixture. The feeds composing the gaseous mixture passing through the catalyst mixture each minute was 5 cc. of furfural, 10 cc. of oxygen, 30 cc. of ammonia, 50 cc. of steam and 90 cc. of helium. The ammonia and furfural were supplied by the two separate lines and all the gaseous materials were preheated to a temperature of 150° C. before they entered the reaction zone proper which was maintained at a temperature of 450° C. Under the above conditions with the apparatus used the ammonia and furfural contacted each other about 0.1 of a second before they contacted the catalyst bed.

Only a small amount of furonitrile was formed and the area immediately ahead of the catalyst rapidly became plugged with a dark brown, tar-like material with considerable amounts of similar material deposited directly on and in the catalyst mixture in the reaction zone.

This example is not part of the invention but is illustrative of difficulties experienced in the preparation of furonitrile directly from ammonia and furfural and of the problems overcome by the novel process of this invention.

*Example II*

To demonstrate the effects of the novel techniques of this invention, a similar tubular reactor was employed and the reaction zone of 4 cc. cavity was loaded with the same catalyst mixture (1 cc. of bismuth molybdate and 3 cc. of glass granules, 10–20 mesh) as in Example I.

Again the gaseous mixture flow over the catalyst was 185 cc./minute and was composed of 5 cc. of furfural, 10 cc. of oxygen, 30 cc. of ammonia, 50 cc. of steam and 90 cc. of helium. However, in this example, the gaseous feeds were all pre-heated to 200° C. and the apparatus was adjusted so that the furfural fed to the reaction zone in one feed line did not contact the ammonia supplied by the other feed line longer than 0.01 of a second before both reactants contacted the catalyst. It was calculated that the furfural and ammonia were in contact with one another for about 0.005 second before they contacted the catalyst.

By operating the process within these parameters no dark brown tar-like materials formed ahead of the catalyst bed, the catalyst bed remained clean and active and the process had a 97% selectivity for furonitrile based on a 85% conversion of furfural during several hours of operation. By contrasting the results of Example II with those obtained in Example I, it can be seen that this process offers a major advance in the preparation of furonitrile.

*Example III*

The conditions in this example were modified in four separate runs using an aluminum-lined steel tubular reactor loaded with a catalyst mixture of 10 to 20 mesh granules of bismuth molybdate and glass combined in the ratio of 1:9. A heating jacket was employed to maintain the reaction zone temperature between 200° and 550° C.

and it was attempted to maintain the temperature of the reaction zone at approximately 455° C. for each of the runs.

The relative molar composition of gaseous mixture passing through the catalyst bed was adjusted to give a gaseous composition of one furfural, two oxygen, ten argon and three ammonia. Through the use of separate feed lines the furfural and ammonia were kept separated so that they did not contact one another for a period of longer than 0.01 second before they actually contacted the catalyst bed. The rest of the conditions for each run are set forth in Table I, which shows effects of gas hourly space velocities (GHSV) from approximately 17,000 to 140,000. It can be seen that the higher selectivities for furonitrile occur at GHSV's between 17,000 and 35,000. The "tars" which are indicated in Table I are formed downstream of the catalyst bed by the unreacted furfural and ammonia leaving the reaction zone and in no way affected the catalytic reaction.

TABLE I

| Run | GHSV | Furfural Conversion, Percent | Percent Selectivity | |
|---|---|---|---|---|
| | | | Furonitrile | Tars Deposited Downstream of the Catalyst |
| (a) | 17,300 | 96 | 80 | 2.5 |
| (b) | 34,750 | 89 | 80 | 3.2 |
| (c) | 69,600 | 77 | 67 | 4.8 |
| (d) | 138,600 | 72 | 62 | 5.7 |

*Example IV*

The catalyst composition was changed in this example to a 3 cc. of bismuth molybdate granules (10–20 mesh) and 17 cc. of aluminum granules having a particle size which will pass a 10 mesh screen but will be retained on a 20 mesh screen. The new catalyst composition was used to load the reaction zone of an aluminum-lined steel reactor with a heating jacket and the reaction zone temperature was maintained at 475° C.

The gaseous mixture passing through the catalyst bed each minute contained 185 cc. of furfural, 320 cc. of oxygen, 170 cc. of steam, 680 cc. of argon, and 360 cc. of ammonia so as to give a gas hourly space velocity of 34,300. Like Examples II and III, all the gaseous feeds were pre-heated to 200° C. and the ammonia and furfural were supplied to the reaction zone through separate feed lines so that they were not in contact with one another for a period longer than 0.01 of a second before they contacted the catalyst. It was calculated that the ammonia and furfural were in contact with one another for approximately 0.005 second prior to contacting the catalyst.

For a period of 28 hours of continuous operation, the process demonstrated a 92 to 95% selectivity for furonitrile based on a 82 to 85% conversion of furfural. No dark brown tar-like materials formed ahead of the catalyst or in the catalyst bed proper, and the catalyst did not lose its activity.

A small amount of dark brown tar-like materials did form in the exit lines from the reaction zone in the area where the effluent from the reaction zone drops to a temperature of approximately 300° C. This does not affect the reaction and a hot solvent spray could be used in the exit lines to ensure that they remained completely clear.

I claim as my invention:

1. In the process of producing furonitrile by intimately contacting
   (a) furfural,
   (b) ammonia,
   (c) molecular oxygen and
   (d) a molybdenum-containing compound as catalyst,
   in the vapor phase at a temperature of from 400° C. to 500° C. at a substantially atmospheric pressure, the improvement which comprises limiting any contact time of said furfural and said ammonia prior to said contacting of furfural, ammonia, molecular oxygen and catalyst to less than 0.1 second.

2. The process of claim 1 wherein the molybdenum-containing compound is bismuth molybdate.

3. The process of claim 2 wherein the temperature is from 440° C. to 480° C. and the substantially atmospheric pressure is less than 30 p.s.i.g.

4. The process of claim 2 wherein any contact time of the furfural and the ammonia prior to the contacting of furfural, ammonia, molecular oxygen and the catalyst is limited to less than 0.01 second.

References Cited by the Examiner

UNITED STATES PATENTS 2,691,037  10/1954  Bellringer et al. _____ 260—465.9
2,904,580  9/1959  Idol _____ 260—465.3

NICHOLAS S. RIZZO, *Primary Examiner.*

HENRY R. JILES, *Examiner.*